United States Patent
Lunn et al.

(10) Patent No.: US 9,034,075 B2
(45) Date of Patent: May 19, 2015

(54) METHODS OF MANUFACTURING HIGH ASPECT RATIO SILVER NANOWIRES

(71) Applicant: Dow Global Technologies LLC, Midland, MI (US)

(72) Inventors: Jonathan D. Lunn, Midland, MI (US); Andrzej Malek, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 308 days.

(21) Appl. No.: 13/857,407

(22) Filed: Apr. 5, 2013

(65) Prior Publication Data

US 2013/0283974 A1  Oct. 31, 2013

Related U.S. Application Data

(60) Provisional application No. 61/640,323, filed on Apr. 30, 2012.

(51) Int. Cl.
  *B22F 9/24* (2006.01)
  *H01B 1/02* (2006.01)
  *B82Y 40/00* (2011.01)
  *B22F 1/00* (2006.01)

(52) U.S. Cl.
  CPC ............ *B22F 9/24* (2013.01); *B22F 2301/255* (2013.01); *B82Y 40/00* (2013.01); *B22F 2304/054* (2013.01); *H01B 1/02* (2013.01); *B22F 1/0025* (2013.01)

(58) Field of Classification Search
  None
  See application file for complete search history.

(56) References Cited

U.S. PATENT DOCUMENTS

| | | | |
|---|---|---|---|
| 7,585,349 B2 | 9/2009 | Xia et al. | |
| 7,922,787 B2 | 4/2011 | Wang et al. | |
| 8,876,937 B2 * | 11/2014 | Peng et al. | 75/371 |
| 2007/0045589 A1 | 3/2007 | Ittel et al. | |
| 2008/0032047 A1 | 2/2008 | Parashar et al. | |
| 2009/0242231 A1 | 10/2009 | Miyagishima et al. | |
| 2010/0078197 A1 | 4/2010 | Miyagishima et al. | |
| 2010/0242679 A1 * | 9/2010 | Yu et al. | 75/345 |
| 2013/0255444 A1 * | 10/2013 | Kawaguchi et al. | 75/371 |

FOREIGN PATENT DOCUMENTS

| | | |
|---|---|---|
| TW | 201024002 | 7/2010 |
| WO | 03032084 | 4/2003 |

OTHER PUBLICATIONS

Korte, et al., Rapid synthesis of silver nanowires through a CuCl- or CuCl2-mediated polyol process, Journal of Materials Chemistry 18, pp. 437-441, (2007).

He, et al., Synthesis and characterization of silver nanowires with zigzag morphology in N,N dimethylformamide, Journal of Solid State Chemistry 180, pp. 2262-2267 (2007).

Zhao, et al., Synthesis and formation mechanism of silver nanowires by a templateless and seedless method, Chemistry Letters, vol. 34, No. 1, pp. 30-31 (2005).

Tang, et al., One-dimensional assemblies of nanoparticles: preparation, properties, and promise, Acvanced Materials 17, No. 8, pp. 951-62 (2005).

Xiong, et al., Formation of silver nanowires through a sandwiched reduction process, Acvanced Materials 15, No. 5, pp. 405-408 (2003).

Sarkar, et al., Effective chemical route for the synthesis of silver nanostructures in formamide, Res. Chem. Intermed 35, pp. 71-78 (2009).

Mdluli, et al., An improved N,N-dimethylformamide and polyvinyl pyrrolidone approach for the synthesis of long silver nanowires, Journal of Alloys and Compounds 469, No. 5, pp. 519-522 (2009).

Walther,et al., Structure-tunable bidirectional hybrid nanowires via multicompartment cylinders, Nano Letters vol. 9, No. 5, pp. 2026-2036 (2009).

Pastoriza-Santos, et al., N,N-Dimethylformamide as a reaction medium for metal nanoparticle synthesis, Advanced Functional Meterials 19, pp. 679-688 (2009).

Sun, et al., Polyol synthesis of uniform silver nanowires: a plausible growth mechanism and the supporting evidence, Nano Letters, vol. 3, No. 7, pp. 955-960 (2003).

Wiley, et al., Polyol synthesis of silver nanostructures: control of product morphology with Fe(II) or Fe(III) species, Langmuir, vol. 21, No. 18, pp. 8077-8080 (2005).

Ducamp-Sanguese, et al., Synthesis and characterization of fine monodisperse silver particles of uniform shape 100, pp. 272-280 (1992).

Wiley, et al., Synthesis of silver nanostructures with controlled shapes and properties 40, pp. 1067-1076 (2007).

Giersig, et al., Evidence of an aggregate mechanism during the formation of silver nanowires in N,N-dimethylformamide, J. Mater. Chem. 14, pp. 607-610 (2004).

Zhao, et al., Low temperature synthesis and growth mechanism of silver nanowires by a soft-chemistry method, Acta Chimica Sinica, vol. 61, No. 10, pp. 1671-1674 (2003).

* cited by examiner

*Primary Examiner* — George Wyszomierski

(74) *Attorney, Agent, or Firm* — Thomas S. Deibert

(57) ABSTRACT

A process for manufacturing high aspect ratio silver nanowires is provided, wherein the recovered silver nanowires exhibit an average diameter of 25 to 80 nm and an average length of 10 to 100 μm; and, wherein the total glycol concentration is <0.001 wt % at all times during the process.

10 Claims, No Drawings

METHODS OF MANUFACTURING HIGH ASPECT RATIO SILVER NANOWIRES

This application claims priority to U.S. Provisional Application No. 61/640,323 filed on Apr. 30, 2012.

The present invention relates generally to the field of manufacture of silver nanowires. In particular, the present invention is directed to a method of manufacturing silver nanowires exhibiting a high aspect ratio (preferably >600) for use in various applications.

Films that exhibit a high conductivity in combination with a high transparency are of great value for use as electrodes or coatings in a wide range of electronic applications, including, for example, touch screen displays and photovoltaic cells. Current technology for these applications involves the use of a tin doped indium oxide (ITO) containing films that are deposited through physical vapor deposition methods. The high capital cost of physical vapor deposition processes has led to the desire to find alternative transparent conductive materials and coating approaches. The use of silver nanowires dispersed as a percolating network has emerged as a promising alternative to ITO containing films. The use of silver nanowires potentially offer the advantage of being processable using roll to roll techniques. Hence, silver nanowires offer the advantage of low cost manufacturing with the potential of providing higher transparency and conductivity than conventional ITO containing films.

The "polyol process" has been disclosed for the manufacture of silver nanostructures. The polyol process uses ethylene glycol (or an alternative glycol) as both a solvent and a reducing agent in the production of silver nanowires. The use of glycols; however, has several inherent disadvantages. Specifically, using glycol as both the reducing agent and the solvent results in a decrease in control over the reaction as the principal reducing agent species (glycolaldehyde) is produced in situ and its presence and concentration are dependent on the extent of exposure to oxygen. Also, the use of glycol introduces the potential for the formation of combustible glycol/air mixtures in the headspace of the reactor used to produce the silver nanowires. Finally, the use of large volumes of glycol create disposal concerns, increasing the cost of commercializing such operations.

One alternative approach to the polyol process for manufacturing silver nanowires has been disclosed by Miyagishima, et al. in United States Patent Application Publication No. 20100078197. Miyagishima, et al. disclose a method for producing metal nanowires, comprising: adding a solution of a metal complex to a water solvent containing at least a halide and a reducing agent, and heating a resultant mixture at 150° C. or lower, wherein the metal nanowires comprise metal nanowires having a diameter of 50 nm or less and a major axis length of 5 μm or more in an amount of 50% by mass or more in terms of metal amount with respect to total metal particles.

Notwithstanding, there remains a need for alternative silver nanowire manufacturing methods. In particular, for methods of manufacturing silver nanowires without the use of glycol, wherein the silver nanowires produced exhibit a high aspect ratio (preferably >600).

The present invention provides a process for manufacturing high aspect ratio silver nanowires, comprising: providing a sugar component containing a reducing sugar, wherein the sugar component is prepared by adding the reducing sugar to a first volume of water, wherein the reducing sugar is selected from the group consisting of glucose, galactose, mannose, fructose, sucrose and maltose; providing a PVP component, wherein the PVP component is prepared by adding polyvinyl pyrrolidone to a second volume of water; providing a copper component containing copper (II) ions, wherein the copper component is prepared by adding a source of copper (II) ions to a third volume of water; providing a halide component containing halide ions, wherein the halide component is prepared by adding a source of halide ions to a fourth volume of water; providing a silver component containing silver ions, wherein the silver component is prepared by adding a source of silver ions to a fifth volume of water; adding the sugar component and the PVP component to a container; adding the copper component and the halide component to the container; adding the silver component to the container with agitation; maintaining the container contents at 110 to 160° C. throughout the addition of the silver component and following the addition of the silver component for a hold period of 8 to 30 hours producing silver nanowires; and, recovering the silver nanowires from the container contents; wherein the container contents exhibit a total glycol concentration of <0.001 wt % at all times during the process; wherein the weight ratio of polyvinyl pyrrolidone to silver added to the container is 4:1 to 10:1; wherein the weight ratio of halide ions to copper (II) ions added to the container is 1:1 to 5:1; wherein the recovered silver nanowires exhibit an average diameter of 25 to 80 nm and an average length of 10 to 100 μm.

The present invention provides a process for manufacturing high aspect ratio silver nanowires, comprising: providing a sugar component containing a reducing sugar, wherein the sugar component is prepared by adding the reducing sugar to a first volume of water, wherein the reducing sugar is selected from the group consisting of glucose, galactose, mannose, fructose, sucrose and maltose; providing a PVP component, wherein the PVP component is prepared by adding polyvinyl pyrrolidone to a second volume of water; providing a copper component containing copper (II) ions, wherein the copper component is prepared by adding a source of copper (II) ions to a third volume of water; providing a halide component containing halide ions, wherein the halide component is prepared by adding a source of halide ions to a fourth volume of water; providing a silver component containing silver ions, wherein the silver component is prepared by adding a source of silver ions to a fifth volume of water; adding the sugar component and the PVP component to a container; adding the copper component and the halide component to the container; heating the contents of the container to a temperature of 110 to 160° C.; dividing the silver component into a first portion and a second portion; then adding the first portion to the container; lowering the temperature of the container contents to 110 to 135° C., then adding the second portion to the container following a delay from the addition of the first portion; and, recovering silver nanowires from the container contents; maintaining the container contents at 110 to 135° C. following addition of the second portion for a hold period of 8 to 30 hours; wherein the container contents exhibit a total glycol concentration of <0.001 wt % at all times during the process; wherein the weight ratio of polyvinyl pyrrolidone to silver added to the container is 4:1 to 10:1; wherein the weight ratio of halide ions to copper (II) ions added to the container is 1:1 to 5:1; wherein the recovered silver nanowires exhibit an average diameter of 20 to 100 nm and an average length of 10 to 100 μm.

The present invention provides a process for manufacturing high aspect ratio silver nanowires, comprising: providing a sugar component containing a reducing sugar, wherein the sugar component is prepared by the reducing sugar to a first volume of water, wherein the reducing sugar is D-glucose; providing a PVP component, wherein the PVP component is prepared by adding polyvinyl pyrrolidone to a second volume of water, wherein the polyvinyl pyrrolidone has a weight average molecular weight, $M_w$, of 40,000 to 60,000 Daltons; providing a copper component containing copper (II) ions, wherein the copper component is prepared by adding a source of copper (II) ions to a third volume of water, wherein the source of copper (II) ions is copper (II) chloride; providing a halide component containing halide ions, wherein the halide component is prepared by adding a source of halide ions to a fourth volume of water, wherein the source of halide ions is sodium chloride; providing a silver component containing silver ions, wherein the silver component is prepared by adding a source of silver ions to a fifth volume of water, wherein the source of silver ions is silver nitrate; adding the sugar component and the PVP component to a container; adding the copper component and the halide component to the container; dividing the silver component into a first portion and a second portion, wherein the first portion is 10 to 30 wt % of the silver component; heating the container contents to a temperature of 145 to 155° C., then adding the first portion to the container; lowering the temperature of the container contents to 125 to 135° C., then adding the second portion to the container following a delay from the addition of the first portion of 5 to 15 minutes; and, maintaining the temperature of the container contents at 125 to 135° C. for 16 to 20 hours following the addition of the second portion to the container; and, recovering silver nanowires from the container contents; wherein the container contents exhibit a total glycol concentration of <0.001 wt % at all times during the process; wherein the weight ratio of polyvinyl pyrrolidone to silver added to the container is 6:1 to 7:1; wherein the weight ratio of halide ions to copper (II) ions added to the container is 2.5:1 to 3.5:1; wherein the recovered silver nanowires exhibit an average diameter of 35 to 50 nm and an average length of 40 to 100 µm; and, wherein the recovered silver nanowires exhibit an average aspect ratio of ≥1,000.

DETAILED DESCRIPTION

A process for manufacturing high aspect ratio silver nanowires has been found which provides silver nanowires having an average diameter of 25 to 60 nm and an average length of 35 to 100 µm, while avoiding the inherent disadvantages associated with the use of glycols.

The term "total glycol concentration" as used herein and in the appended claims in reference to the container contents means combined total of the concentration of all glycols (e.g., ethylene glycol, propylene glycol, butylene glycol, poly(ethylene glycol), poly(propylene glycol)) present in the container.

The term "high aspect ratio" as used herein and in the appended claims in reference to the recovered silver nanowires means that the average aspect ratio of the recovered silver nanowires is >600. Preferably, the recovered silver nanowires exhibit an average aspect ratio of ≥800. Most preferably, the recovered silver nanowires exhibit an average aspect ratio of ≥1,000.

Preferably, the process for manufacturing high aspect ratio silver nanowires of the present invention, comprises: providing a sugar component containing a reducing sugar, wherein the sugar component is prepared by adding the reducing sugar to a first volume of water (preferably, wherein the first volume of water used to prepare the sugar component is selected from distilled water and deionized water; more preferably, wherein the first volume of water is both distilled and deionized), wherein the reducing sugar is selected from the group consisting of glucose, galactose, mannose, fructose, sucrose and maltose (preferably, wherein the reducing sugar is D-glucose); providing a PVP component, wherein the PVP component is prepared by adding polyvinyl pyrrolidone (preferably, wherein the polyvinyl pyrrolidone used has a weight average molecular weight, $M_w$, of 20,000 to 300,000 Daltons; more preferably, wherein the polyvinyl pyrrolidone used has a weight average molecular weight, $M_w$, of 30,000 to 200,000 Daltons; most preferably, wherein the polyvinyl pyrrolidone used has a weight average molecular weight, $M_w$, of 40,000 to 60,000 Daltons) to a second volume of water (preferably, wherein the second volume of water used to prepare the PVP component is selected from distilled water and deionized water; more preferably, wherein the second volume of water is both distilled and deionized); providing a copper component containing copper (II) ions, wherein the copper component is prepared by adding a source of copper (II) ions (preferably, wherein the source of copper (II) ions is selected from the group consisting of $CuCl_2$ or $Cu(NO_3)_2$) to a third volume of water (preferably, wherein the third volume of water used to prepare the copper component is selected from distilled water and deionized water; more preferably, wherein the third volume of water is both distilled and deionized); providing a halide component containing halide ions, wherein the halide component is prepared by adding a source of halide ions (preferably, wherein the source of halide ions is a source of chloride ions; preferably wherein the source of chloride ions is sodium chloride) to a fourth volume of water (preferably, wherein the fourth volume of water used to prepare the chloride component is selected from distilled water and deionized water; more preferably, wherein the fourth volume of water is both distilled and deionized); providing a silver component containing silver ions, wherein the silver component is prepared by adding a source of silver ions (preferably, wherein the source of silver ions is a silver complex; more preferably, where the source of silver ions is silver nitrate ($AgNO_3$)) to a fifth volume of water (preferably, wherein the fifth volume of water used to prepare the silver component is selected from distilled water and deionized water; more preferably, wherein the fifth volume of water is both distilled and deionized) (preferably, wherein the silver component exhibits a silver concentration of 0.2 to 1 M; more preferably 0.4 to 1 M; most preferably 0.4 to 0.5 M); adding the sugar component and the PVP component to a container; adding the copper component and the halide component to the container; adding the silver component to the container with agitation; maintaining the container contents at 110 to 160° C. (preferably, 125 to 155° C.; most preferably, 130 to 150° C.) throughout the addition of the silver component and following the addition of the silver component for a hold period of 8 to 30 hours (preferably, 8 to 20 hours; more preferably 16 to 20 hours); and, recovering silver nanowires from the container contents; wherein the container contents exhibit a total glycol concentration of <0.001 wt % at all times during the process; wherein the weight ratio of polyvinyl pyrrolidone to silver added to the container is 4:1 to 10:1 (preferably 5:1 to 8:1; most preferably 6:1 to 7:1); wherein the weight ratio of halide ions to copper (II) ions added to the container is 1:1 to 5:1 (preferably 2:1 to 4:1; more preferably 2.5:1 to 3.5:1); wherein the recovered silver nanowires exhibit an average diameter of 25 to 80 nm (preferably, 25 to 60 nm; more preferably, 35 to 50 nm) and an average length of 10 to 100 µm (preferably, 35 to 100 µm; more preferably, 40 to 100 µm). Preferably, the recovered silver nanowires exhibit an average aspect ratio of >600 (more preferably, ≥800; most preferably ≥1,000).

Preferably, the process of the present invention further comprises: dividing the silver component into at least two individual portions, wherein the individual portions are added to the container with a delay between the individual portion additions. More preferably, the method of the present invention further comprises: dividing the silver component into a first portion and a second portion (preferably, wherein the first portion is 10 to 30 wt % of the silver component; more preferably, wherein the first portion is 15 to 25 wt % of the silver component; most preferably, wherein the first portion is 20 wt % of the silver component); heating the container contents to 140 to 160° C. (preferably, 145 to 155° C.) before adding the first portion to the container; and then lowering the temperature of the container contents to 110 to 150° C. (preferably, 110 to 135° C.; more preferably, 125 to 135° C.), before adding the second portion to the container following a delay from the addition of the first portion. Preferably, the delay between the additions of the individual portions of the silver component is a period of 1 to 60 minutes (more preferably, 1 to 20 minutes; most preferably, 5 to 15 minutes).

Preferably, the process of the present invention further comprises: dividing the silver component into a first portion and a second portion (preferably, wherein the first portion is 10 to 30 wt % of the silver component; more preferably, wherein the first portion is 15 to 25 wt % of the silver component; most preferably, wherein the first portion is 20 wt % of the silver component); heating the container contents to 140 to 160° C. (preferably, 145 to 155° C.) before adding the first portion to the container; lowering the temperature of the container contents to 110 to 150° C. (preferably, 110 to 135° C.; more preferably, 125 to 135° C.), before adding the second portion to the container following a delay from the addition of the first portion; and, maintaining the temperature of the container contents at 110 to 150° C. (preferably, 110 to 135° C.; more preferably, 125 to 135° C.) for 8 to 30 hours (preferably, 8 to 20 hours; more preferably 16 to 20 hours) following addition of the second portion to the container. Preferably, the delay between the additions of the first portion and the second portion is a period of 1 to 60 minutes (more preferably, 1 to 20 minutes; most preferably, 5 to 15 minutes).

Preferably, the process for manufacturing high aspect ratio silver nanowires of the present invention, comprises: providing a sugar component containing a reducing sugar, wherein the sugar component is prepared by adding D-glucose to a first volume of water (preferably, wherein the first volume of water used to prepare the sugar component is selected from distilled water and deionized water; more preferably, wherein the first volume of water is both distilled and deionized); providing a PVP component, wherein the PVP component is prepared by adding polyvinyl pyrrolidone having a weight average molecular weight $M_w$, of 20,000 to 300,000 Daltons (preferably 40,000 to 60,000 Daltons) to a second volume of water (preferably, wherein the second volume of water used to prepare the PVP component is selected from distilled water and deionized water; more preferably, wherein the second volume of water is both distilled and deionized); providing a copper component containing copper (II) ions, wherein the copper component is prepared by adding $CuCl_2$ to a third volume of water (preferably, wherein the third volume of water used to prepare the copper component is selected from distilled water and deionized water; more preferably, wherein the third volume of water is both distilled and deionized); providing a halide component containing halide ions, wherein the halide component is prepared by adding NaCl to a fourth volume of water (preferably, wherein the fourth volume of water used to prepare the halide component is selected from distilled water and deionized water; more preferably, wherein the fourth volume of water is both distilled and deionized); providing a silver component containing silver ions, wherein the silver component is prepared by adding $AgNO_3$ to a fifth volume of water (preferably, wherein the fifth volume of water used to prepare the silver component is selected from distilled water and deionized water; more preferably, wherein the fifth volume of water is both distilled and deionized) (preferably, wherein the silver component exhibits a silver concentration of 0.2 to 1 M; more preferably 0.4 to 1 M; most preferably 0.4 to 0.5 M); adding the sugar component and the PVP component to a container; adding the copper component and the halide component to the container; dividing the silver component into a first portion and a second portion (preferably, wherein the first portion is 10 to 30 wt % of the silver component; more preferably, wherein the first portion is 15 to 25 wt % of the silver component; most preferably, wherein the first portion is 20 wt % of the silver component); heating the container contents to a temperature of 140 to 160° C. (preferably, 145 to 155° C.); then adding the first portion to the container; lowering the temperature of the container contents to 110 to 150° C. (preferably, 110 to 135° C.; more preferably, 125 to 135° C.); then adding the second portion to the container following a delay from the addition of the first portion of 1 to 60 minutes (more preferably, 1 to 20 minutes; most preferably, 5 to 15 minutes); then maintaining the temperature of the container contents at 110 to 135° C. for 8 to 30 hours (preferably, 8 to 20 hours; more preferably 16 to 20 hours) following the addition of the second portion to the container; and, recovering silver nanowires from the container contents; wherein the container contents exhibit a total glycol concentration of <0.001 wt % at all times during the process; wherein the weight ratio of polyvinyl pyrrolidone to silver added to the container is 4:1 to 10:1 (preferably 5:1 to 10:1; more preferably 5:1 to 8:1; most preferably 6:1 to 7:1); wherein the weight ratio of halide ions to copper (II) ions added to the container is 1:1 to 5:1 (preferably 2:1 to 4:1; more preferably 2.5:1 to 3.5:1); wherein the recovered silver nanowires exhibit an average diameter of 25 to 80 nm (preferably, 25 to 60 nm; more preferably 35 to 50 nm) and an average length of 10 to 100 μm (preferably, 35 to 100 μm; most preferably, 40 to 100 μm) (preferably, wherein the silver nanowires exhibit an average aspect ratio of >600; more preferably, ≥800; most preferably ≥1,000).

Some embodiments of the present invention will now be described in detail in the following Examples.

Example 1

Preparation of Sugar Component

D-glucose (1.518 g; 98% from Sigma-Aldrich) was dissolved in 200 mL of deionized water to form the sugar component.

Example 2

Preparation of PVP Component

Polyvinyl pyrrolidone having a weight average molecular weight of 55,000 Daltons (6.526 g; from Sigma-Aldrich) was dissolved in 100 mL of deionized water to form the PVP component.

Example 3

Preparation of Copper Component

Copper (II) chloride (0.269 g) was dissolved in 500 mL of deionized water to form the copper component.

Example 4

Preparation of Copper Component

Copper (II) nitrate trihydrate ($Cu(NO_3)_2 \cdot 3H_2O$) (0.483 g) was dissolved in 500 mL of deionized water to form the copper component.

Example 5

Preparation of Halide Component

Sodium chloride (0.117 g) was dissolved in 500 mL of deionized water to form the halide component.

Example 6

Preparation of Silver Component

Silver nitrate (1.589 g; >99% from Sigma-Aldrich) was dissolved in 20 mL of deionized water to form the silver component having a 0.470 M Ag concentration.

Example 7

Preparation of Silver Component

Silver nitrate (1.589 g; >99% from Sigma-Aldrich) was dissolved in 100 mL of deionized water to form a comparative silver component having a 0.094 M Ag concentration.

Example 8

Preparation of Silver Nanowires

A 600 mL Parr reactor outfitted with an overhead mixer and a Camille temperature controller was used. The sugar component (173.2 mL) prepared according to Example 1 was added to the reactor. The mixer was engaged at a stirring rate of 210 revolutions per minute. The PVP component (78.0 mL) prepared according to Example 2 was then added to the reactor. The copper component (2.08 mL) prepared according to Example 3 and the halide component (2.08 mL) prepared according to Example 5 were then added to the reactor with continued stirring. The reactor was then closed up and the temperature controller was set at 130° C. with a temperature ramp of 3° C./min up to 100° C. and 1° C./min from 100 to 130° C. After the reactor contents reached 130° C., the silver component (15.6 mL) prepared according to Example 6 was added to the reactor. Eighteen hours following the addition of the silver component, the temperature controller was turned off and the reactor contents were allowed to cool to room temperature. The mixer was disengaged. The reactor was then vented to relieve and pressure build up in the vessel. The product solids in the reactor contents were then collected by centrifugation. The product silver nanowires were then analyzed using an FEI Nova NanoSEM field emission gun scanning electron microscope (SEM) using FEI's Automated Image Acquisition (AIA) program. For each sample, AIA was performed at five sub-locations using magnifications of 42 µm, 12 µm and 6 µm field of view. The product silver nanowires were determined to exhibit an average diameter of 40 nm with an average length of 15 to 30 µm using ImageJ software.

Example 9

Preparation of Silver Nanowires

A 600 mL Parr reactor outfitted with an overhead mixer and a Camille temperature controller was used. The sugar component (173.2 mL) prepared according to Example 1 was added to the reactor. The mixer was engaged at a stirring rate of 210 revolutions per minute. The PVP component (78.0 mL) prepared according to Example 2 was then added to the reactor. The copper component (2.08 mL) prepared according to Example 3 and the halide component (2.08 mL) prepared according to Example 5 were then added to the reactor with continued stirring. The reactor was then closed up and the temperature controller was set at 150° C. with a temperature ramp of 3° C./min up to 100° C. and 1° C./min from 100 to 150° C. After the reactor contents reached 150° C., a first portion (15.6 mL) of the silver component prepared according to Example 7 was added to the reactor. The temperature controller was then set at 130° C. Ten minutes following the addition of the first portion to the reactor, a second portion of the silver component (62.4 mL) was then added to the reactor. Eighteen hours following the addition of the second portion of the silver component, the temperature controller was turned off and the reactor contents were allowed to cool to room temperature. The mixer was disengaged. The reactor was then vented to relieve and pressure build up in the vessel. The product solids in the reactor contents were then collected by centrifugation. The product silver nanowires were then analyzed using a the method described in Example 8 and determined to exhibit an average diameter of 53 nm with an average length of 60 µm.

Example 10

Preparation of Silver Nanowires

A 600 mL Parr reactor outfitted with an overhead mixer and a Camille temperature controller was used. The sugar component (173.2 mL) prepared according to Example 1 was added to the reactor. The mixer was engaged at a stirring rate of 210 revolutions per minute. The PVP component (78.0 mL) prepared according to Example 2 was then added to the reactor. The copper component (2.08 mL) prepared according to Example 3 and the halide component (2.08 mL) prepared according to Example 5 were then added to the reactor with continued stirring. Deionized water (62.4 mL) was then added to the reactor. The reactor was then closed up and the temperature controller was set at 150° C. with a temperature ramp of 3° C./min up to 100° C. and 1° C./min from 100 to 150° C. After the reactor contents reached 150° C., a first portion (3.12 mL) of the silver component prepared according to Example 6 was added to the reactor. The temperature controller was then set at 130° C. Ten minutes following the addition of the first portion to the reactor, a second portion of the silver component (12.48 mL) was then added to the reactor. Eighteen hours following the addition of the second portion of the silver component, the temperature controller was turned off and the reactor contents were allowed to cool to room temperature. The mixer was disengaged. The reactor was then vented to relieve and pressure build up in the vessel. The product solids in the reactor contents were then collected by centrifugation. The product silver nanowires were then analyzed using the method described in Example 8 and were determined to exhibit an average diameter of 52 nm with an average length of greater than 10 µm.

Comparative Example A

Preparation without Copper Component

A 600 mL Parr reactor outfitted with an overhead mixer and a Camille temperature controller was used. The sugar component (173.2 mL) prepared according to Example 1 was added to the reactor. The mixer was engaged at a stirring rate of 210 revolutions per minute. The PVP component (78.0 mL) prepared according to Example 2 was then added to the reactor. The halide component (6.24 mL) prepared according to Example 5 was then added to the reactor with continued stirring. The reactor was then closed up and the temperature controller was set at 150° C. with a temperature ramp of 3° C./min up to 100° C. and 1° C./min from 100 to 150° C. After the reactor contents reached 150° C., a first portion (15.6 mL) of the silver component prepared according to Example 7 was added to the reactor. The temperature controller was then set at 130° C. Ten minutes following the addition of the first portion to the reactor, a second portion of the silver component (62.4 mL) was then added to the reactor. Eighteen hours following the addition of the second portion of the silver component, the temperature controller was turned off and the reactor contents were allowed to cool to room temperature. The mixer was disengaged. The reactor was then vented to relieve and pressure build up in the vessel. The reactor contents were then centrifuged to collect any product solids. Almost no product silver nanowires were obtained. The product solids were mostly short rods having a length of <2 μm as determined using the method described in Example 8.

Comparative Example B

Preparation without Sugar Component

A 600 mL Parr reactor outfitted with an overhead mixer and a Camille temperature controller was used. Deionized water (173.2 mL) was added to the reactor. The mixer was engaged at a stirring rate of 210 revolutions per minute. The PVP component (78.0 mL) prepared according to Example 2 was then added to the reactor. The copper component (2.08 mL) prepared according to Example 3 and the halide component (2.08 mL) prepared according to Example 5 were then added to the reactor with continued stirring. The reactor was then closed up and the temperature controller was set at 150° C. with a temperature ramp of 3° C./min up to 100° C. and 1° C./min from 100 to 150° C. After the reactor contents reached 150° C., a first portion (15.6 mL) of the silver component prepared according to Example 7 was added to the reactor. The temperature controller was then set at 130° C. Ten minutes following the addition of the first portion to the reactor, a second portion of the silver component (62.4 mL) was then added to the reactor. Eighteen hours following the addition of the second portion of the silver component, the temperature controller was turned off and the reactor contents were allowed to cool to room temperature. The mixer was disengaged. The reactor was then vented to relieve and pressure build up in the vessel. The reactor contents were then centrifuged to collect any product solids. The product solids in the reactor contents were then collected by centrifugation. The product silver nanowires were then analyzed using the method described in Example 8 and were determined to exhibit an average diameter of 46 nm with an average length of greater than 8.7 μm.

We claim:

1. A process for manufacturing high aspect ratio silver nanowires, comprising:
   providing a sugar component containing a reducing sugar, wherein the sugar component is prepared by adding the reducing sugar to a first volume of water, wherein the reducing sugar is selected from the group consisting of glucose, galactose, mannose, fructose, sucrose and maltose;
   providing a polyvinyl pyrrolidone (PVP) component, wherein the PVP component is prepared by adding polyvinyl pyrrolidone to a second volume of water;
   providing a copper component containing copper (II) ions, wherein the copper component is prepared by adding a source of copper (II) ions to a third volume of water;
   providing a halide component containing halide ions, wherein the halide component is prepared by adding a source of halide ions to a fourth volume of water;
   providing a silver component containing silver ions, wherein the silver component is prepared by adding a source of silver ions to a fifth volume of water;
   adding the sugar component and the PVP component to a container;
   adding the copper component and the halide component to the container;
   adding the silver component to the container with agitation;
   maintaining the container contents at 110 to 160° C. throughout the addition of the silver component and following the addition of the silver component for a hold period of 8 to 30 hours producing silver nanowires; and,
   recovering the silver nanowires from the container contents;
   wherein the container contents exhibit a total glycol concentration of <0.001 wt % at all times during the process; wherein the weight ratio of polyvinyl pyrrolidone to silver added to the container is 4:1 to 10:1; wherein the weight ratio of halide ions to copper (II) ions added to the container is 1:1 to 5:1; wherein the recovered silver nanowires exhibit an average diameter of 25 to 80 nm and an average length of 10 to 100 μm.

2. The process of claim 1, further comprising:
   dividing the silver component into a first portion and a second portion;
   heating the container contents to 140 to 160° C., then adding the first portion to the container;
   lowering the temperature of the container contents to 110 to 135° C., then adding the second portion to the container following a delay after the addition of the first portion.

3. The process of claim 2, wherein the temperature of the container contents is maintained at 110 to 135° C. for 8 to 30 hours following the addition of the second portion to the container.

4. The process of claim 3, wherein the reducing sugar used in the sugar component is glucose.

5. The process of claim 3, wherein the polyvinyl pyrrolidone used in the PVP component has a weight average molecular weight, $M_w$, of 40,000 to 150,000 Daltons.

6. The process of claim 3, wherein the source of copper (II) ions in the copper component is copper (II) chloride.

7. The process of claim 3, wherein the source of halide ions used in the halide component is sodium chloride.

8. The process of claim 3, wherein the source of silver ions used in the silver component is silver nitrate.

9. The process of claim 1, further comprising:
   dividing the silver component into a first portion and a second portion;
   heating the container contents to 140 to 160° C., then adding the first portion to the container;
   lowering the temperature of the container contents to 110 to 135° C., then adding the second portion to the container following a delay from the addition of the first portion; and, maintaining the temperature of the container contents at 110 to 135° C. for 8 to 30 hours following the addition of the second portion to the container;

wherein the reducing sugar used in the sugar component is glucose;

wherein the polyvinyl pyrrolidone used in the PVP component has a weight average molecular weight, $M_w$, of 40,000 to 60,000 Daltons;

wherein the source of copper (II) ions used in the copper component is copper (II) chloride;

wherein the source of halide ions used in the halide component is sodium chloride; and, wherein the source of silver ions used in the silver component is silver nitrate.

10. The method of claim 1, further comprising:

dividing the silver component into a first portion and a second portion, wherein the first portion is 10 to 30 wt % of the silver component;

heating the container contents to a temperature of 145 to 155° C., then adding the first portion to the container;

lowering the temperature of the container contents to 125 to 135° C., then adding the second portion to the container following a delay from the addition of the first portion of 5 to 15 minutes; and, maintaining the temperature of the container contents at 125 to 135° C. for 16 to 20 hours following the addition of the second portion to the container;

wherein the reducing sugar used in the sugar component is D-glucose;

wherein the polyvinyl pyrrolidone used in the PVP component has a weight average molecular weight, $M_w$, of 40,000 to 60,000 Daltons;

wherein the source of copper (II) ions used in the copper component is copper (II) chloride;

wherein the source of halide ions used in the halide component is sodium chloride;

wherein the source of silver ions used in the silver component is silver nitrate; and, wherein the weight ratio of polyvinyl pyrrolidone to silver added to the container is 6:1 to 7:1; wherein the weight ratio of halide ions to copper (II) ions added to the container is 2.5:1 to 3.5:1; wherein the recovered silver nanowires exhibit an average diameter of 35 to 50 nm and an average length of 40 to 100 μm; and, wherein the recovered silver nanowires exhibit an average aspect ratio of ≥1,000.

\* \* \* \* \*